United States Patent [19]

Ausiello

[11] Patent Number: 4,527,071
[45] Date of Patent: Jul. 2, 1985

[54] MODULAR POWER PLANT FOR THE COMBINED PRODUCTION OF ELECTRICAL AND THERMAL ENERGY AND INSTALLATION COMPRISING A PLURALITY OF MODULAR POWER PLANTS

[75] Inventor: Francesco P. Ausiello, Turin, Italy

[73] Assignee: Fiat Auto S.p.A., Turin, Italy

[21] Appl. No.: 492,754

[22] Filed: May 9, 1983

[30] Foreign Application Priority Data

May 7, 1982 [IT] Italy .............................. 67006 A/82

[51] Int. Cl.³ .......................... F02N 11/06; H02J 3/04
[52] U.S. Cl. ...................... 290/4 R; 290/2; 290/34; 290/35; 290/40 R; 318/447; 60/709; 364/132; 364/184; 364/492; 307/81
[58] Field of Search ................... 290/1 R, 2, 4, 34, 35, 290/40; 307/81, 86, 51, 76; 318/447; 60/709; 364/132, 134, 133, 184–187, 492, 494

[56] References Cited

U.S. PATENT DOCUMENTS

| | | | |
|---|---|---|---|
| 3,875,390 | 4/1975 | Eccles et al. | 364/187 X |
| 4,114,730 | 9/1978 | Means et al. | 187/29 R |
| 4,123,794 | 10/1978 | Matsumoto | 364/101 |
| 4,245,163 | 1/1981 | Philippe | 60/709 X |
| 4,275,311 | 6/1981 | Agazzone et al. | 290/2 |
| 4,346,789 | 8/1982 | Ekholm | 187/29 R |
| 4,355,705 | 10/1982 | Schröder et al. | 187/29 R |

Primary Examiner—Vit W. Miska
Assistant Examiner—Paul Shik Luen Ip
Attorney, Agent, or Firm—Sughrue, Mion, Zinn, Macpeak, and Seas

[57] ABSTRACT

A modular power plant comprises an internal combustion engine coupled to an electrical machine. The electrical machine may be used to start the engine and to generate electrical energy. The power plant is provided with an electronic control and protection system comprising an electronic processing and control unit arranged to operate in a first mode when the power plant is used alone, and in a second mode when the power plant is used together in a coordinated manner in an installation comprising a further n power plants. In this second mode of operation the processing and control unit may act as a master unit for controlling and coordinating the operation of the processing and control units of the other n power plants in a predetermined manner, or as a slave unit controlled by another control and processing unit of one of the other n power plants. Means are provided for assigning the roll of master unit to one of the control and processing units of the n+1 power plants.

2 Claims, 3 Drawing Figures

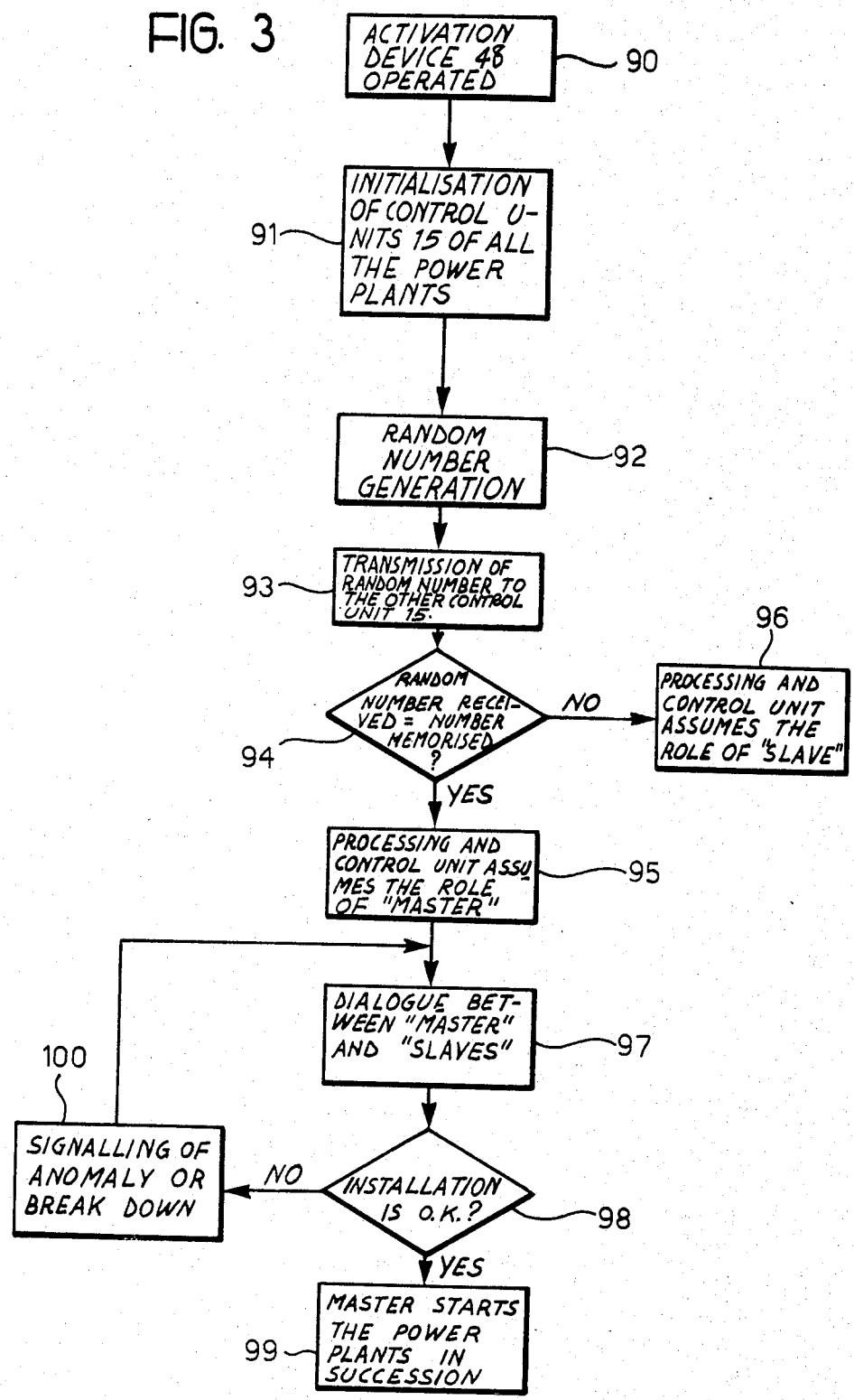

MODULAR POWER PLANT FOR THE COMBINED PRODUCTION OF ELECTRICAL AND THERMAL ENERGY AND INSTALLATION COMPRISING A PLURALITY OF MODULAR POWER PLANTS

FIELD OF THE INVENTION

The present invention relates to a modular power plant for the combined production of electrical and thermal energy and to an installation comprising a group of such modular power plants.

In particular the invention relates to modular power plants for the combined production of electrical and thermal energy of the type comprising:
(a) a liquid-cooled internal combustion engine;
(b) an asynchronous electrical machine coupled to the internal combustion engine and usable both to start the engine and to generate electrical energy;
(c) means for recovering and re-using the energy converted into heat in the said internal combustion engine and in the electrical machine;
(d) alarm and signalling devices of an optical or audible type;
(e) an electronic control and protection system, comprising a plurality of electrical sensors each responsive to a respective parameter indicative of the conditions of operation of the power plant, a plurality of actuator devices operable by means of activation signals to modify, in a predetermined manner, the operation of the power plant, and an electronic processing and control unit connected to the sensors, to the actuator devices, and to the signalling devices; the electronic processing and control unit being arranged to operate in a first mode when the power plant is used alone, and to operate in a second mode when the generator is used together in a coordinated manner with a further n power plants, n being a whole number greater than or equal to 1; the control and processing unit in the said first mode of operation, controlling the said actuator devices to operate in a predetermined manner in dependence on information provided by the sensors, and activating the signalling and alarm devices when the sensors indicate operational anomalies or breakdowns.

BACKGROUND OF THE INVENTION

An installation of the aforesaid type for the combined production of electrical and thermal energy comprising a plurality of modular power plants, is known from U.S. Pat. No. 4,275,311 in the name of the same Applicant and of the Societa Ercole Marelli & C. S.p.A. This known installation is further provided with a control and protection system comprising a plurality of control modules each connected to a respective power plant and a central unit connected to the control modules. The central unit controls the operation of the individual power plants by means of control signals fed to the individual control modules, on the basis of information signals provided by the control modules relating to the operational conditions of each individual power plant.

In the installation described and illustrated in the said U.S. Patent the control modules are physically distinct and separate from the power plants respectively associated therewith. The central unit is similarly distinct and separate from the control modules. This necessarily involves complicated and laborious assembly operations for the entire installation which involves not inconsiderable losses of time for making the connections of the power plants to their respective control modules and the connection of these latter together and to the central unit.

Although the installation illustrated in the aforesaid U.S. Patent has a modular structure which can be made up by the interconnection of a limited number of basic units (modular power plants, control modules and central unit) it is, however, desirable further to reduce the number of these basic units, if possible, so as to provide a single basic unit which is able to operate independently or to be interconnected with any desired number of other identical units to form installations with widely different power and performance ratings as needed.

A further disadvantage of the installation according to the aforesaid U.S. Patent lies in the fact that the central unit operates constantly and this results in considerable overworking of its circuit components and consequently to frequent maintenance and/or repairs.

The object of the present invention is to provide a power plant for the combined production of electrical and thermal energy which can be used alone, or in a coordinated manner together with other identical power plants to form an installation of greater power without the need to use and to connect further units or control modules and which is thus simpler and quicker to assemble.

SUMMARY OF THE INVENTION

In order to achieve this object the invention provides a modular power plant of the type specified at the beginning, the main characteristic of which lies in the fact that the said control and processing unit further includes:

a manually-operated activation device arranged to emit an enabling signal when operated;

at least one input/output port connectible via a transmission path to corresponding input/output ports of the processing and control units of the other power plants, memory means for memorising electrical signals indicative of an integer number between 1 and $n+1$ which is unique to the power plant, signal generator means arranged, when activated, to feed to the input/output port coded electrical signals indicative of a randomly chosen number between 1 and $n+1$;

detection and comparison means connected to the input/output port and to the memory means; and in that the processing and control unit in the second mode of operation is arranged to
(i) operate as a master unit for controlling and coordinating the operation of the control and processing units of the other n power plants in a predetermined manner when the coded signals received by the detection and comparison means coincide with those stored in the memory means; and
(ii) operate as a slave unit controlled by another control and processing unit of one of the other n power plants, when the coded signals received by the detection and comparison means do not coincide with those stored in the memory means.

A further object of the invention is to provide an installation for the combined production of electrical and thermal energy, comprising a plurality of such power plants.

In such an installation the control and processing units for the individual power plants fulfill the onerous role of being the master unit in a random manner which allows less overworking and hence less frequent maintenance or repair of the circuits of the control and processing units.

BRIEF DESCRIPTION OF THE DRAWINGS

Further characteristics and advantages of the present invention will emerge from the detailed description which follows, with reference to the appended drawings provided purely by way of non-limiting example, in which:

FIG. 3 is a flow diagram illustrating the sequence of several operations carried out by the control and processing unit of a power plant of the invention during a starting phase.

DESCRIPTION OF THE PREFERRED EMBODIMENT

Figure 1:
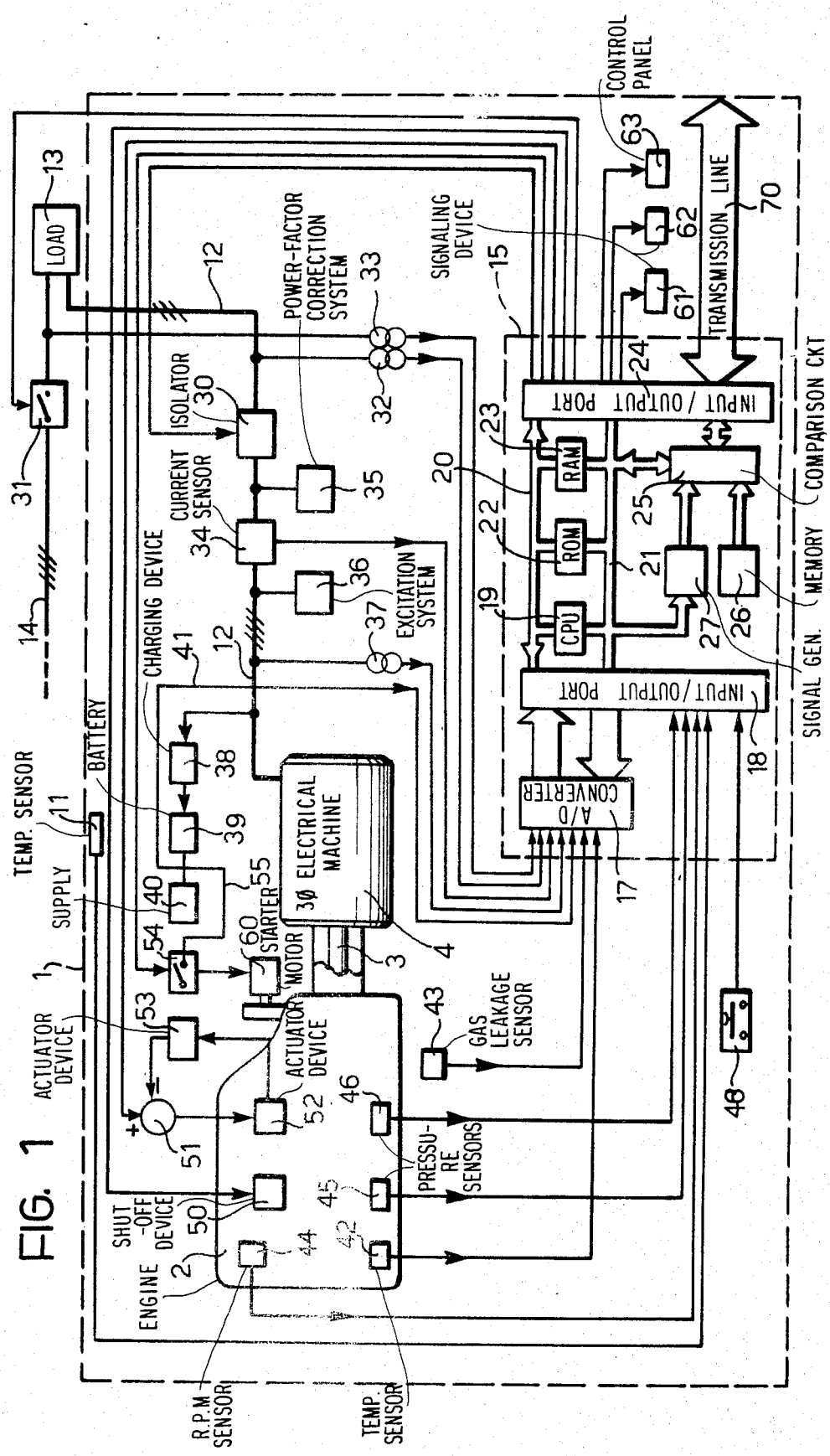
FIG. 1 is a diagram, partly in block form, illustrating a modular power plant according to the present invention.

FIG. 1 illustrates a modular generating set 1 comprising an internal combustion engine 2, the shaft (not shown) of which is coupled to the shaft 3 of an asynchronous three-phase electrical machine 4. The electrical machine 4 is usable both as an electric motor for starting the internal combustion engine 2 and as a generator for producing electrical energy.

Figure 2:
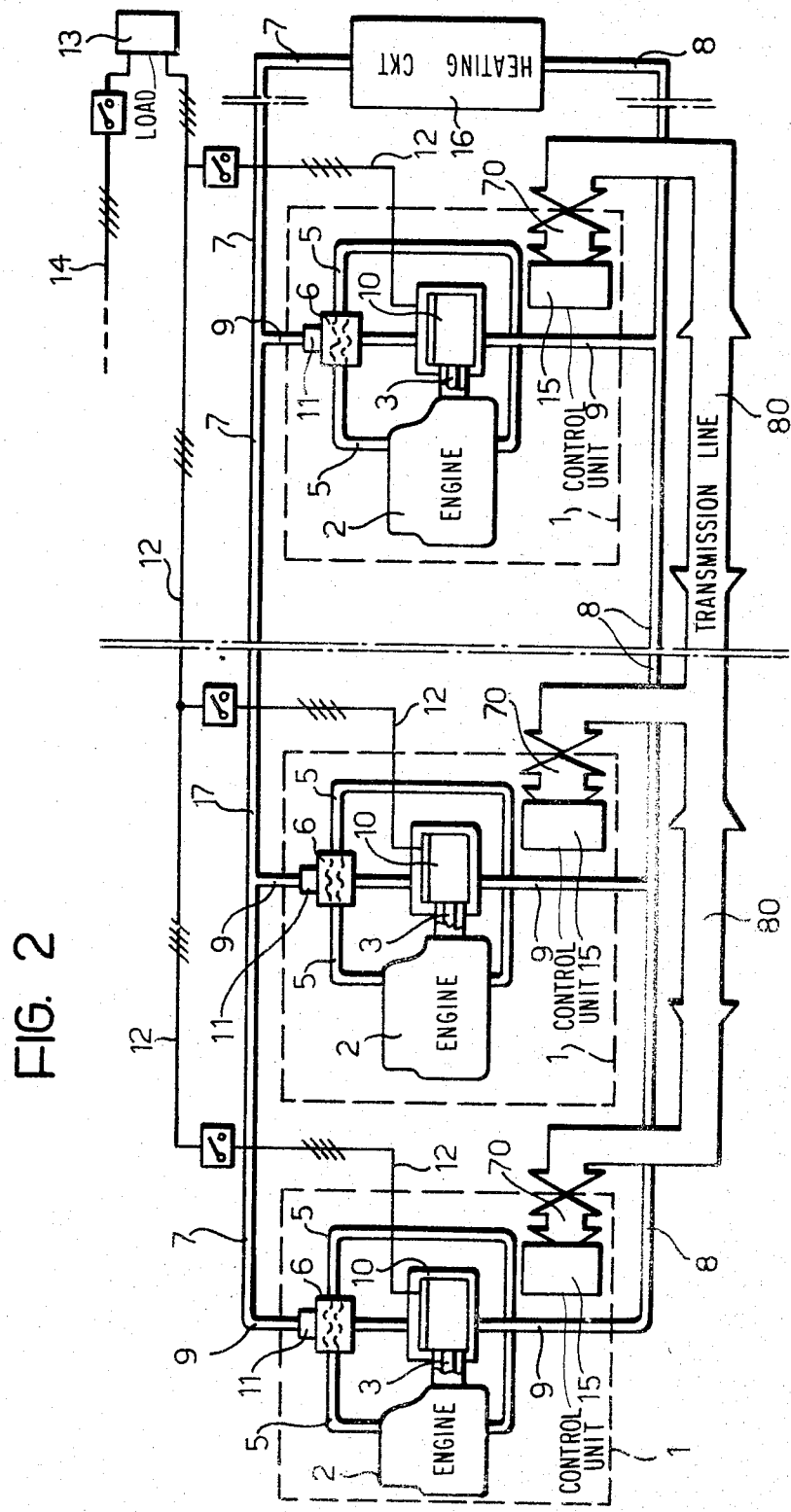
FIG. 2 illustrates schematically an installation comprising a plurality of modular power plants according to FIG. 1.

As will be seen from FIG. 2, each modular power plant 1 further includes a liquid circuit for recovering heat from the cooling water of the engine 2, from the exhaust gases and from the lubricating oil of the engine itself, through heat exchangers not illustrated. This liquid circuit includes a duct 5 through which the cooling fluid of the engine 2 circulates.

FIG. 2 shows a heat exchanger 6 traversed by the duct 5. In this heat exchanger, the liquid circulating through the duct 5 gives up heat to a second liquid. Each modular power plant 1 is connected in a liquid heating circuit traversed by this second liquid.

The liquid heating circuit includes a delivery duct 7 and return duct 8 between which are connected secondary ducts 9 for providing a flow of this second liquid through a jacket 10 surrounding the electrical machine 4 and through the heat exchanger 6.

A temperature sensor 11 is located in that part of the secondary duct 9 traversed by the liquid leaving the heat exchanger 6.

The electrical machine 4 is connected through a three-phase line 12 to a group of electrical loads 13.

A three-phase electrical supply line 14 is connected to the electrical power distribution network and is connectible to the group of electrical loads 13.

By 15 is generally indicated an electronic processing and control unit comprising an analogue/digital converter 17 connected to an input/output port 18. A central processing unit (CPU) 19 is connected to the input/output port 18, to the read-only memory circuits (ROM) 22, to random-access memory circuits (RAM) 23 and to a second input/output port 24 by means of two bi-directional buses indicated by 20 and 21, respectively. The processing and control unit 15 further includes a detection and comparison circuit 25 the operations of which will be more fully described below, connected to the input/output port 24, to memory circuits 26 and to a random signal generator 27. The detection and comparison circuit 25 and the random signal generator 27 are connected to the central processing unit 19 by means of transmission lines which branch from the bus 21.

The processing and control unit 15 constitutes part of a control and protection system for the power plant and further includes a plurality of sensors and actuator devices which will be described below.

An isolator 30 is connected into the three-phase electrical line 12 and is controlled by the processing and control unit 15 to permit or prevent the connection of the electrical machine 4 to the group of loads 13. A similar isolator 31 (similarly controlled by the processing and control unit) is connected to the three-phase electrical line 14 to permit or prevent the connection of the loads 13 to the electrical power distribution network.

Two voltage transformers 32, 33 are connected on one side downstream of the isolator 30 and of the isolator 31, and on their other sides to the analogue/digital converter 17 to provide the processing and control unit with an information signal on the presence or absence of voltage downstream of the isolators.

A current sensor 34 is connected in the three-phase electrical line 12 upstream of the isolator 30. This current sensor is also connected to the analogue/digital converter 17 to provide the processing and control unit 15 with a signal indicative of the magnitude of the current supplied by the electrical machine 4. Downstream of this current sensor, a power-factor correction system 35 of conventional type is connected to the electrical line 12. Upstream of the current sensor 34 is connected an excitation system 36 of conventional type for providing the electrical machine 4 with the reactive power needed for its starting. A further voltage transformer 37 is connected to the electrical line 12 upstream of the excitation system 36. This transformer is connected to the analogue/digital converter 17 to provide the processing and control unit with a signal indicative of the effective value of the voltage generated by the electrical machine 4.

Also connected to the electrical line 12 is a battery-charging device 38 for charging a battery of accumulators 39 for supplying the electrical system of the internal combustion engine 2. The battery 39 is connected to a stabilized supply 40 connected (in a manner not shown) to the constituent devices of the processing and control unit 15 to provide them with their necessary supply voltage.

The battery 39 is further connected to the analogue/digital converter 17 by a line 41 to provide the processing and control unit 15 with information relating to the instantaneous voltage supplied by the battery.

The analogue/digital converter 17 is further connected to a sensor 42 for sensing the temperature of the water in the engine 2.

When the fuel for the internal combustion engine 2 is a gas, for example, methane, a sensor 43 may be provided for detecting any gas leakage, the sensor also being connected to the analogue/digital converter 17.

The aforesaid system for protection and control of the power plant further includes a sensor 44 of the rate of rotation of the engine, and two sensors 45 and 46 which respectively detect the pressure and the level of the lubricating oil in the engine 2. These latter sensors, together with the temperature sensor 11 mentioned above, are connected to the input/output port 18 of the processing and control unit 15. This input/output port is further connected to a manually-operable activation device 48 which, when operated, provides an enabling signal to the processing and control unit 15 for actuating the entire power plant (1).

The input/output port 24 of the processing anc control unit 15 is connected not only to the isolators 30 and 31, but also to a shut-off device 50 located in the fuel supply duct of the engine 2. This input/output port is further connected to a first input of a summing circuit 51 the output of which is connected to an actuator device 52 which controls the position of the throttle valve of the engine 2. This actuator device is connected to a device 53 for detecting the position of the throttle valve, and is connected in its turn to a second input (−) of the summing circuit 51. The summing circuit 51, the actuator device 52 and the position detector device 53 constitute a negative feedback loop intended to stabilize the position of the throttle valve at a value established by the processing and control unit 15 according to the conditions of operation of the entire power plant.

A switch device 54 controlled by the control and processing unit 15 through the input/output port 24 is interposed in a line 55 connecting the battery 39 to the starter motor 60 of the internal combustion engine 2.

The input/output unit 24 is further connected to signalling devices 61, 62 of optical or audible type intended to provide alarm signals when the control and processing unit receives information signals indicative of anomalous operating conditions or break downs of the power plant from the aforementioned sensors.

The input/output unit 24 is durther connected to a control panel 63 for visually displaying information relating to the instantaneous operating conditions of the power plant.

The input/output unit 24 is further connected to a bi-directional transmission line 70 connectable, as illustrated in FIG. 2, to corresponding input/output ports of the processing and control units of other power plants by means of an interconnecting transmission line 80.

The processing and control unit 15 is arranged to operate in a first mode when the power plant 1 is used alone and to operate in a second mode when the power plant is used in a coordinated manner together with a further n power plants connected together in the manner illustrated in FIG. 2.

In the first mode of the operating, the control and processing unit 15 of the power plant controls the actuator devices 50, 52, 54, 30 and 31 in a predetermined manner in dependence on information contained in the signals coming from the sensors described above.

Thus, for example, the processing and control unit 15 may be arranged to allow the ignition of the internal combustion engine a predetermined time after the starting of the electrical machine 4, so as to permit the latter to reach its running conditions before the ignition of the engine to which it is coupled. The processing and control unit 15 may also prevent the starting of the internal combustion engine or may stop its operation when the temperature detected by the sensor 11 exceeds a predetermined threshold value.

In the second mode of operation, the processing and control unit 15 of each power plant 1 may act as a master unit for controlling and coordinating the operation of the processing and control units of the other power plants of the installation in a predetermined manner or may act as a slave to another processing and control unit 15 of one of the other power plants which acts as the master unit.

An installation of the type illustrated in FIG. 2 is started by operation of the control device 48 of any one of the modular power plants of the installation (block 90 of the flow diagram of FIG. 3). The activation device 48 operated provides an enabling signal to the processing and control unit 15 to which it is connected. This latter provides initialisation signals to the processing and control units 15 of the other power plants 1 of the installation (block 91 in FIG. 3) through the transmission line 70 and the interconnecting line 80.

The random signal generator 27 of the processing and control unit 15 activated by the activation device 48 operated previously, generates coded electrical signals indicative of a whole number chosen randomly between 1 and the entire number of the power plants constituting the installation. These coded signals are transmitted to the processing and control units 14 of all the other power plants 1 through the transmission lines 70, 80.

At this point, in the processing and control unit 15 of each power plant, the detection and comparison circuit 25 compares the coded signals received with memorized electrical signals in the memory circuits 26 which are indicative of an integer number which is unique to each power plant, and is between 1 and the total number of power plants.

The detection and comparison circuit 25 of only one power plant identifies the coded signals received as being the same as the coded signals memorized in the memory circuits 26 connected thereto. This detection and comparison circuit 25 provides the central processsing unit 19 of its own control and processing unit 15 with a "self-recognition" signal, as a result of which this processing and control unit takes on the role of master (FIG. 3, blocks 93–95).

The processing and control units 15 whose detection and comparison circuits 25 have not identified the random number received as the random number memorized in the memory circuits 26, are instead arranged to operate as slave units (FIG. 3 block 96).

The processing and control unit acting as the master starts and controls a "dialogue" with the processing and control units which are acting as slaves, to acquire information on the status of all the power plants of the installation (block 97 of FIG. 3).

Once this phase has finished, if the installation does not exhibit any abnormal conditions or breakdowns, the unit operating as master first of all controls the starting of the power plant associated therewith and then, through the units acting as slaves causes the successive starting of all the other power plants of the installation (blocks 98, 99 in the diagram of FIG. 3). If, however, not all the operating parameters of the installation fall within predetermined ranges of values, or if some member of the installation is broken, the unit acting as the master operates the signalling and alarm devices to signal these defective conditions (FIG. 3 block 100).

During operation of the installation, the unit acting as the master, carries out, in conventional manner, periodic "dialogues" with the slave units to check the operating conditions of the entire installation, and controls the actuator devices, described previously, in a predetermined manner in dependence on the information contained in the signals coming from the sensors associated with each power plant, and indicates any anomalous operation or breakdowns.

Naturally, the principle of the invention remaining the same, the embodiments and the details of realization may be varied widely with respect to that described and illustrated purely by way of non-limiting example without thereby departing from the scope of the present invention.

The expert of the art will recognize for example, that each processing and control unit 15 could be formed without any specific detection and comparison circuit and without any random signal generator. The functions carried out by these circuits could, in a known manner, be carried out by the central processing unit 19 itself, programmed in a known manner to generate coded signals indicative of a random number and to carry out comparison programs between the coded signals received through the input/output port 24 and coded signals previously memorized and indicative of, that is unique to, the corresponding power plant.

I claim:

1. A modular power plant for the combined production of electrical and thermal energy, comprising:
   (a) a liquid-cooled internal combustion engine;
   (b) an asychronous electrical machine coupled to said internal combustion engine and usable both to start the engine and to generate electrical energy,
   (c) means for recovering the energy converted into heat in the said internal combustion engine and in said electrical machine,
   (d) alarm and signalling devices;
   (e) an electronic control and protection system comprising a plurality of electrical sensors each responsive to a respective parameter indicative of the conditions of operation of the power plant, a plurality of actuator devices operable in a predetermined manner to modify the operation of the power plant, and an electronic processing and control unit arranged to operate in a first mode when the power plant is used alone, and to operate in a second mode when the power plant is used together in a coordinated manner with a further n power plants, n being a whole number greater than or equal to 1; the said control and processing unit in the said first mode of operation, controlling the said actuator devices to operate in a predetermined manner in dependence on information provided by the said sensors and activating the said signalling and alarm devices when the sensors indicate operational anomalies or breakdowns, the said processing and control unit comprising:
   a manually-operated activation device arranged to emit an enabling signal when operated;
   at least one input/output port connectable via a transmission path to corresponding input/output ports of the processing and control units of the other power plants,
   memory means for memorizing coded electrical signals indicative of an integer between 1 and n+1 which is unique to the power plant;
   signal generator means arranged, when activated, to feed to the said input/output port coded electrical signals indicative of a randomly chosen number between 1 and n+1; and
   detection and comparison means connected to the said input/output port and to the said memory means; the processing and control unit in the second mode of operation being arranged to
   (i) operate as a master unit for controlling and coordinating the operation of the control and processing units of the other n power plants in a predetermined manner when the coded signals received by said detection and comparison means coincide with those stored in the said memory means; and
   (ii) operate as a slave unit controlled by another control and processing unit of one of the other n power plants, when the coded signals received by the detection and comparison means do not coincide with those stored in the memory means.

2. An installation for the combined production of electrical and thermal energy, comprising a group of n modular power plants each comprising:
   (a) a liquid-cooled internal combustion engine;
   (b) an asynchronous electrical machine coupled to said internal combustion engine and usable both to start the engine and to generate electrical energy;
   (c) means for recovering the energy converted into heat in the said engine and in the said electrical machine,
   (d) alarm and signalling devices;
   (e) an electronic control and protection system comprising a plurality of electrical sensors each responsive to a respective parameter indicative of the conditions of operation of the power plant, a plurality of actuator devices operable in a predetermined manner to modify the operation of the power plant, and an electronic processing and control unit connected to said sensors, to said actuator devices and to said signalling and alarm devices, said control and processing unit controlling the actuator devices in said predetermined manner in dependence on information coming from the sensors, and activating the signalling and alarm devices when the sensors indicate operational anomalies or breakdowns, the control and processing unit of each modular power plant comprising:
   a manually-operated activation device arranged to emit an enabling signal when operated;
   at least one input/output port connectable via a transmission path to corresponding input/output ports of the processing and control units of the other power plants;
   memory means for memorizing electrical signals indicative of an integer between 1 and n+1 which is unique to the power plant;
   signal generator means activated upon receipt of an enabling signal to feed to said input/output port coded electrical signals indicative of an integer randomly chosen from between 1 and n; and
   detection and comparison means connected to the said input/output port and to the said memory means; the control and processing unit of each power plant being arranged to
   (i) operate as a master unit for controlling and coordinating the operation of the control and processing units of the other n−1 power plants in a predetermined manner when the coded signals received by the detection and comparison means correspond with those stored in the memory means;
   (ii) operate as a slave unit controlled by another control and processing unit of one of the other n−1 power plants, when the coded signals received by the detection and comparison means do not correspond with those stored in the memory means.

* * * * *